Feb. 12, 1957 W. R. SMITH ET AL 2,781,483
TIMING AND ACTUATING MECHANISM
Filed March 31, 1953 7 Sheets-Sheet 1

INVENTORS
WILLIAM R. SMITH
CHESTER C. SPERRY
BY
ATTORNEY

INVENTORS
WILLIAM R. SMITH
CHESTER C. SPERRY
BY
ATTORNEY

Feb. 12, 1957 W. R. SMITH ET AL 2,781,483
TIMING AND ACTUATING MECHANISM
Filed March 31, 1953 7 Sheets-Sheet 4

INVENTORS
WILLIAM R. SMITH
CHESTER C. SPERRY
BY
ATTORNEY

INVENTORS
WILLIAM R. SMITH
CHESTER C. SPERRY
BY
ATTORNEY

United States Patent Office 2,781,483
Patented Feb. 12, 1957

2,781,483

TIMING AND ACTUATING MECHANISM

William R. Smith and Chester C. Sperry, Kalamazoo, Mich., assignors to The Upjohn Company, Kalamazoo, Mich., a corporation of Michigan Application March 31, 1953, Serial No. 346,006

21 Claims. (Cl. 318—102)

This invention relates to a countercurrent liquid-liquid distribution apparatus and particularly to an actuating mechanism for applying to a bank of receptacles used therein a plurality of motions as required to effect the efficient operation of the receptacles and their respective inter-connecting conduits with respect to liquids contained therein.

The process of countercurrent liquid-liquid distribution has long been known and it has customarily been carried out in a series of individual containers, such as test tubes. In this process, a material having different solubilities in two different immiscible liquids is shaken in a test tube having some of each of said liquids therein. One definite portion, as ⅓, of the material will go into one liquid which may for convenience be termed the lower liquid and another definite portion, as ⅔, will go into solution in the other liquid, which may for convenience be termed the upper liquid inasmuch as said two liquids are selected so that they will separate and one will lie above the other. With all of the test tubes supplied with quantities of the lower liquid, which quantities are equal to each other, the upper liquid in the first test tube is moved into each of the several test tubes one after the other and is shaken successively with the lower liquid in each thereof. As the upper liquid from the first test tube is moved out therefrom, an equal quantity of the same liquid is supplied to said first test tube and it is shaken with the lower liquid which was permitted to remain in said first test tube and it is then supplied to the second test tube after the first quantity of upper liquid therein has been moved on to the third test tube. The quantities of upper liquid in each test tube are thus moved successively throughout the entire bank of test tubes and shaken with the lower liquid in each test tube. Thus, the process has the effect of moving two quantities of immiscible liquids in countercurrent flow and stopping said quantities for shaking with each other at closely spaced steps in such flow. When the process is completed, it will be found that if the solute in the liquids is of pure form it will be concentrated within a few of the test tubes in a manner having well known and recognizable characteristics and the homogenous character of the solute will thus be definitely established. If two or more solutes are present, the concentration of solutes in the several test tubes will have an entirely different pattern which is equally well known and recognizable to persons skilled in the art.

In some instances, where two or more materials are present and a large number of test tubes, as one or two hundred, are used, the materials will concentrate in sufficiently widely separated test tubes that this process is also available, at least on a laboratory scale, for the purpose of effecting separations.

The carrying out of this process by having a highly paid chemist spending his time shaking test tubes is obviously uneconomic, and in any event it is highly tedious to the chemist concerned. Hence, there has been developed an apparatus wherein the test tubes are arranged in one or more self-supporting banks and said test tubes are permanently provided with such adjacent chambers, and conduits inter-connecting same, that the shaking and transferring can be accomplished merely by the operating of a crank connected to the entire bank. However, since the process requires a substantial amount of time for completion, even this working of the crank becomes highly tedious and time consuming and it has long been desirable to provide a mechanical device for carrying out this function. However, the motions involved are of such a nature that no mechanical driving means has hitherto been discovered which could carry out the desired motions and, further, inasmuch as the necessary periods for which different motions are required very widely according to the materials being handled, the problem of adjustment of any mechanical driving means to fit such varying requirements becomes very difficult.

Still further, the operations of shaking and tipping must be performed at a sufficiently slow and steady rate that the liquid materials being shaken will not be caused to emulsify to any appreciable extent.

Accordingly, a principal object of the invention is to provide an actuating mechanism or device for a bank of countercurrent liquid-liquid distribution receptacles or tubes which will be capable of following the peculiar pattern of motions required for effecting a conventional countercurrent liquid-liquid distribution operation.

A further object of the invention is to provide a mechanism, as aforesaid, which can be readily attached to, and used with, presently known countercurrent liquid-liquid distribution apparatus.

A further object of the invention is to provide a device, as aforesaid, which will be capable of wide adjustment in all parts of its operational sequence.

A further object of the invention is to provide a mechanism, as aforesaid, which will be positive and reliable in its operation.

A further object of the invention is to provide a device, as aforesaid, having a pair of independently operated motors wherein one motor effects the tipping function of the apparatus and the other motor operates the shaking function.

A further object of the invention is to provide a mechanism, as aforesaid, which will be completely automatic throughout its entire operation.

A further object of the invention is to provide a mechanism, as aforesaid, in which all of the parts may be made mechanically sturdy whereby to minimize maintenance cost.

A further object of the invention is to provide a device, as aforesaid, in which all of the parts are readily accessible in order further to minimize maintenance cost.

Other objects and purposes of the invention will be apparent to persons acquainted with apparatus of this general type upon a reading of the following specification and inspection of the accompanying drawings.

IN GENERAL

In general, a preferred embodiment of our invention comprises a rotatably mounted framework having (1) means driven by a first motor attached thereto for rotating said framework in a predetermined pattern under the control of suitable switch actuating means which will start, stop and reverse said first motor and (2) a linkage driven by a second motor, said second motor being mounted bodily on said framework, said linkage under the urging of said second motor effecting controlled oscillation of said framework, and said second motor being likewise controlled by a suitable switch and switch actuating device.

DETAILED DESCRIPTION

Figure 6:
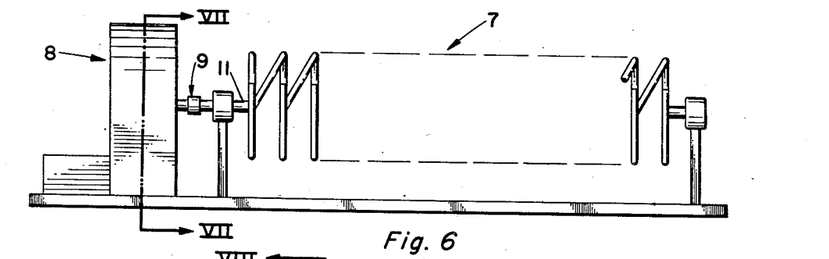
Figure 6 is a schematic side view of the mechanism of the invention in association with a typical distribution apparatus.
Figure 8:
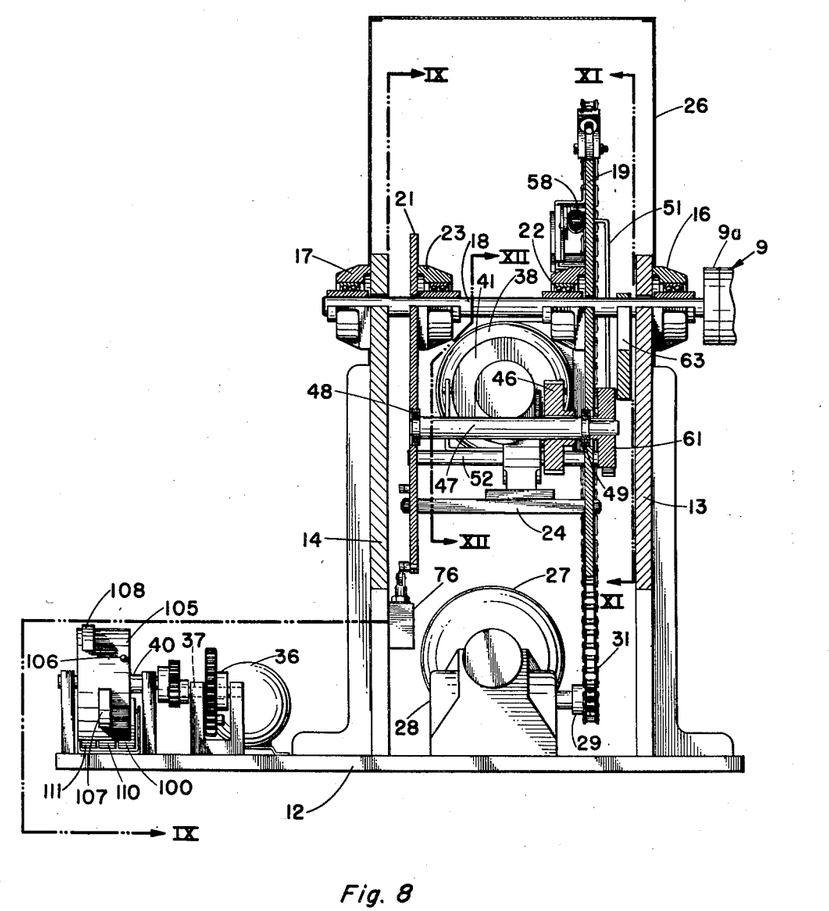
Figure 8 is a sectional view taken on the line VIII—VIII of Figure 7.

For purposes of convenience in reference, and with no intention to limit, the following terminology will be used: the terms "upper" and "lower" will refer to directions with respect to the apparatus when positioned in its normal position of use; the terms "inner" and "outer" will refer to directions toward and away from the geometric center of the device constituting the invention and the terms "clockwise" and "counterclockwise" will be taken as looking toward the apparatus from the leftward end thereof, as appearing in Figures 6 and 8.

Figure 1:
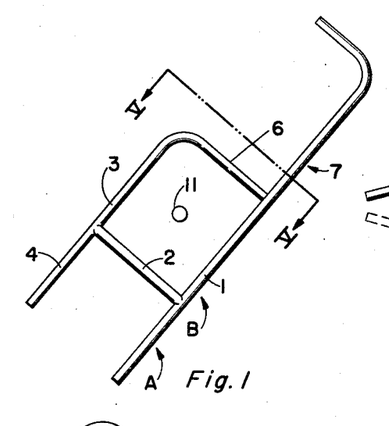
Figure 1 is a schematic end view of a bank of tubes in a typical countercurrent distribution apparatus illustrating the starting position thereof.
Figure 3:
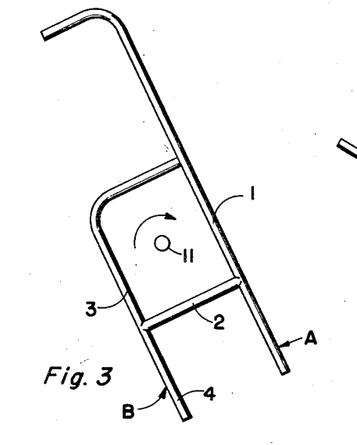
Figure 3 illustrates the position of the receptacles wherein the quantities of upper liquid are moved from the shaking chambers into intermediate chambers preparatory to transferring them into the next respectively succeeding shaking chambers.
Figure 4:
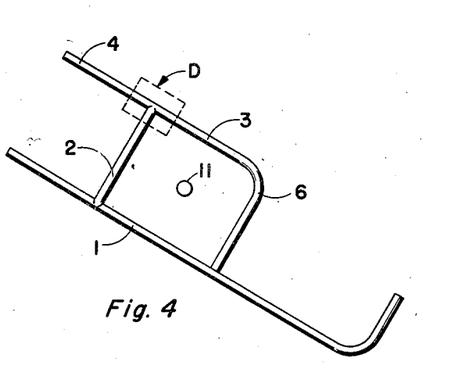
Figure 4 illustrates the position of the receptacles during the operation wherein quantities of upper liquid from each set of intermediate chambers are shifted into the next respectively succeeding shaking chambers.
Figure 4A:
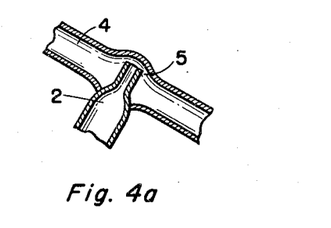
Figure 4a is an enlarged central sectional view of the area enclosed by the broken line D in Figure 4.
Figure 5:
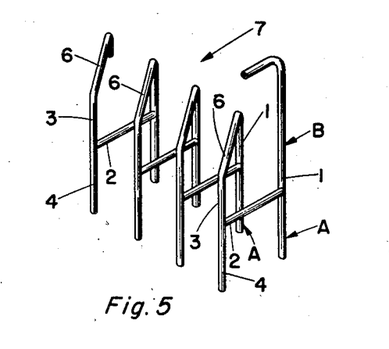
Figure 5 is an oblique view of a bank of tubes showing the conduits for moving liquid between successive shaking chambers.

Figure 1 schematically illustrates an end view of a bank of receptacles 7 in a conventional countercurrent distribution apparatus which is to be operated by the device of the invention. In normal operation the shaking chamber 1 of each receptacle is filled with equal volumes of two immiscible solvents for the material being separated, or tested, the first solvent "A" filling the shaking chamber to its point of intersection with the cross tube 2 and the second solvent "B" being of approximately equal amount and disposed above solvent "A." With the two solvents "A" and "B" in place, the tubes are rocked between the two positions appearing in Figure 2 at a controlled speed for mixing the two solvents and causing them to dissolve the solute added thereto. After a predetermined period of time, the receptacles are turned counterclockwise into the position in Figure 3 in which the solvent "B" will run down the cross tube 2 and into the intermediate chamber 4. The receptacles are then rotated in a clockwise direction as indicated by the arrow in Figure 3 into the position shown in Figure 4. The solvent "B" from the intermediate chamber 4 will by-pass the upper end of the cross tube 2, one-way flow means 5 (Figure 4a) having been supplied to the point of intersection between said cross tube 2 and said intermediate chamber 4, and thence through the tube 3 and the transfer tube 6 into the shaking chamber 1 of the next adjacent receptacle, as best shown in Figure 5. The cycle is then repeated.

Referring now to Figure 6, the bank of receptacles or tubes 7, shown in more detail in Figures 1 to 5, inclusive, is conventional and is now commonly rotated by a crank (not shown) attached to a shaft 11 by which said bank of tubes is supported and oscillated. The subject matter of the present invention is the mechanical driving mechanism or device 8 which is attached in any convenient manner, as by a conventional coupling 9, to the shaft 11 in place of said crank.

Turning now to Figures 7 to 12 inclusive, for disclosure of the operating mechanism of the present invention, and referring first particularly to Figure 8, there is provided a base 12 having upright frame members 13 and 14 extending upwardly therefrom which respectively support the bearings 16 and 17. The shaft 18 is mounted within said bearings and one portion 9a of the coupling 9 may be mounted thereon.

A pair of panels 19 and 21 are affixed to the bearing structures 22 and 23, respectively, and these in turn are mounted on said shaft 18, said shaft being rotatable with respect to said panels. Said panels 19 and 21 are connected by a plurality of suitable connectors, of which one is shown at 24.

A removable cover 26 may enclose the entire structure for the purpose of keeping out dirt and protecting the mechanism.

A positioning motor 27 is mounted on the base 12 of the device and this motor drives a gear box 28 which in turn drives a sprocket 29. A chain 31 engages said sprocket 29 and extends around the edges of the panel 19, the respective ends 32 and 33 (Figure 7) of said chain being fastened by any convenient type of clamps to said panel 19. Thus, rotation of said motor in one direction will turn said panel 19 in one direction and rotation of said motor in the other direction will turn said panel 19 in an opposite direction. The conventional resistance of a reduction gear drive, especially a worm-type drive, to force applied at its normally driven end will, when said motor is de-energized hold the panel 19 and the panel 21, stationary.

A timing motor 36 (Figures 8 and 9) is operatively connected through speed reduction gearing 34 and a countershaft 37 to a shaft 40 on which are located a plurality of cam structures which are hereinafter described in more detail. Said timing motor 36 operates constantly during the operation of the machine and its sole function is to drive said cams.

An oscillating motor 38 (Figures 7 and 8) is mounted in a convenient manner upon the panel 19 and drives the driving element 39 of clutch mechanism 41. The driven element 42 of said clutch is connected through conventional splining to the shaft 43 of a reduction gear box 44 which drives a pinion 45 engaging a gear 46. Said gear 46 is mounted on the shaft 47 (Figure 8) for rotation therewith and said shaft 47 is mounted rotatably with respect to the panels 19 and 21 by the bearings 48 and 49.

The driven element 42 of the clutch 41 is shiftable with respect to the driving element 39 by the lever 51 (Figures 8 and 11) which is pivotally mounted at its lower end on the panel 19 by the shaft 52. A conventional clutch fork 53 (Figure 12) also mounted on the shaft 52 engages the shiftable element 42 of the clutch by the bearing 54. The solenoid 56 (Figure 7) is mounted on the panel 19 and is connected at 57 to the upper end of said lever 51 for effecting movement thereof in the leftward direction as appearing in Figure 7 upon energization thereof. A spring 58 is provided for moving the upper end of said lever 51 in a rightward direction upon de-energization of said solenoid.

The friction contact member 55 (Figure 7) is non-rotatably affixed to the gear box 44 for engagement by the driven element 42 for the purpose of quickly stopping rotation of the shaft 43 and parts connected therewith upon de-energization of the solenoid 56 and in response to movement of the lever 51 by the spring 58.

A disk or crank 61 (Figures 8 and 11) is mounted on, and for rotation with, the shaft 47 and said disk is pivotally connected at a point near its periphery to a link 62. A crank 63 is mounted at one end upon, and non-rotatably with respect to, said shaft 18 by any convenient means, as a clamp 64, and is pivotally connected at its other end 66 to the link 62.

Inasmuch as the crank 63 is rotatable with the shaft 18, it will be apparent that energization of the motor 38 and the subsequent engagement of elements 39 and 42 of the clutch 41 will act through the gear box 44, the gear 46 and the shaft 47 to rotate the disk 61 and thereby effect oscillation of said shaft 18. When the positioning motor 27 is energized, the panel 19 is rotated and shaft 47 is thereby moved in a circular path. Because of the linkage 61, 62, 63, 64, shaft 18 will be caused to rotate to the same arcuate extent as panel 19.

A normally closed stop switch 71 (Figure 11), conveniently a micro-switch, is mounted on the outer face of the panel 19 and its actuator 72 bears against the pin 70 on the disk 61 to open said switch very briefly at a point in the rotation of said disk determined by the positioning of said pin 70. The purpose of this switch will appear hereinafter.

A further normally closed micro-switch 73 (Figure 9) is positioned below and adjacent the periphery of the panel 21 to function as a safety switch in the manner described in more detail hereinafter and is actuated by the screws 74 and 75 projecting from the periphery of said panel 21 at points representing the extremities of rotation of said panel when said screws are respectively adjacent said safety switch 73. A limit switch 76, also preferably a micro-switch, is provided adjacent the periphery of the panel 21 and is positioned for actuation by the screws 77, 78, 79 and 81 secured to said panel adjacent the periphery thereof. As shown in Figure 8, said limit switch 76 is preferably mounted on the inner face of the frame member 14 and the safety switch 73 is similarly mounted.

Figures 9, 12, 14, 15:
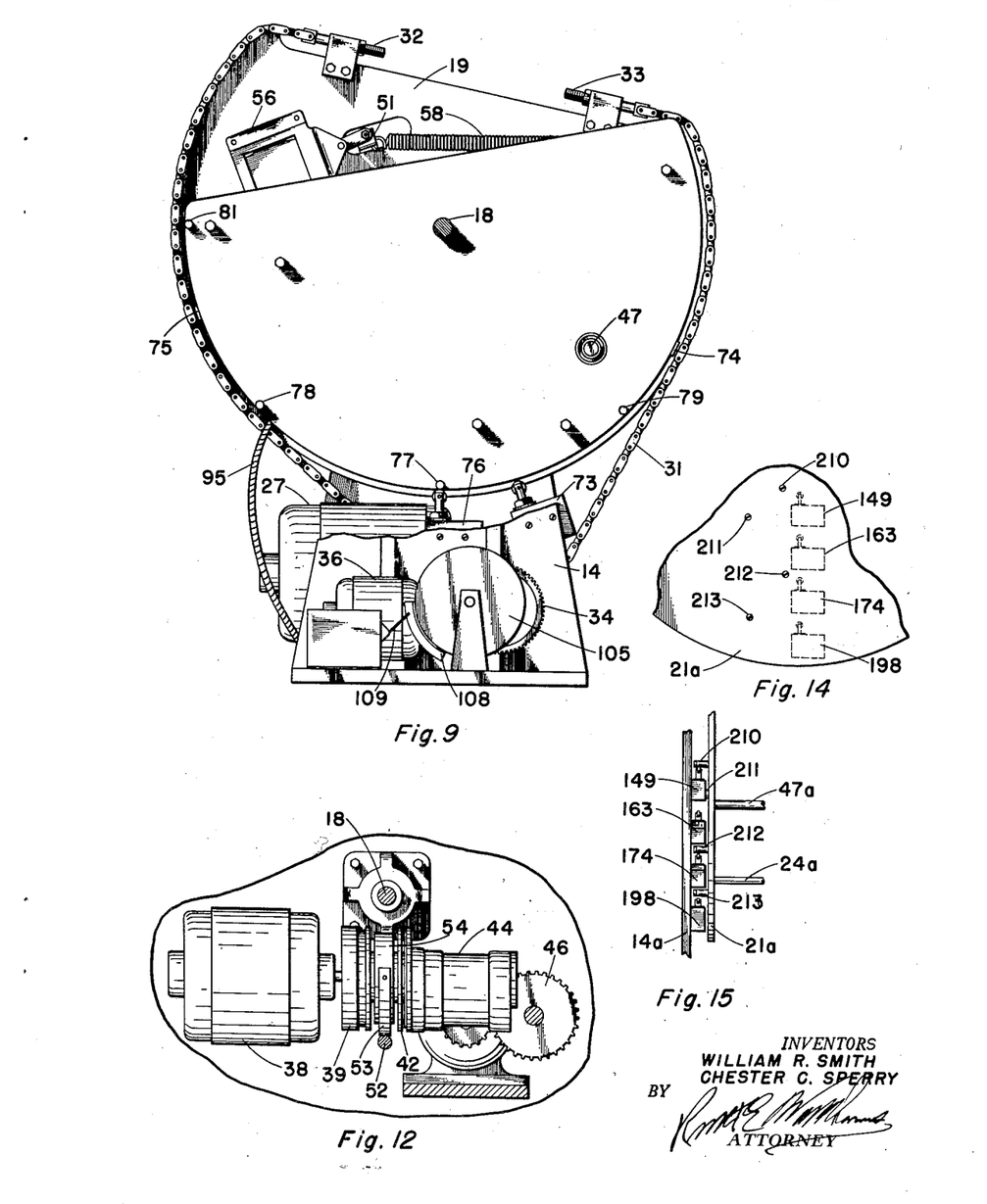
Figure 9 is a sectional rear view of the actuating mechanism taken on line IX—IX of Figure 8.
Figure 12 is a sectional view taken on the line XII—XII of Figure 8.
Figure 14 is a view similar to a fragment of Figure 9 and shows a modified switch and switch actuating arrangement used with the circuit shown in Figure 13.
Figure 15 is a view similar to a fragment of Figure 8 and shows the switch and switch actuator arrangement of Figure 14 from the rightward side thereof.
Figure 10:
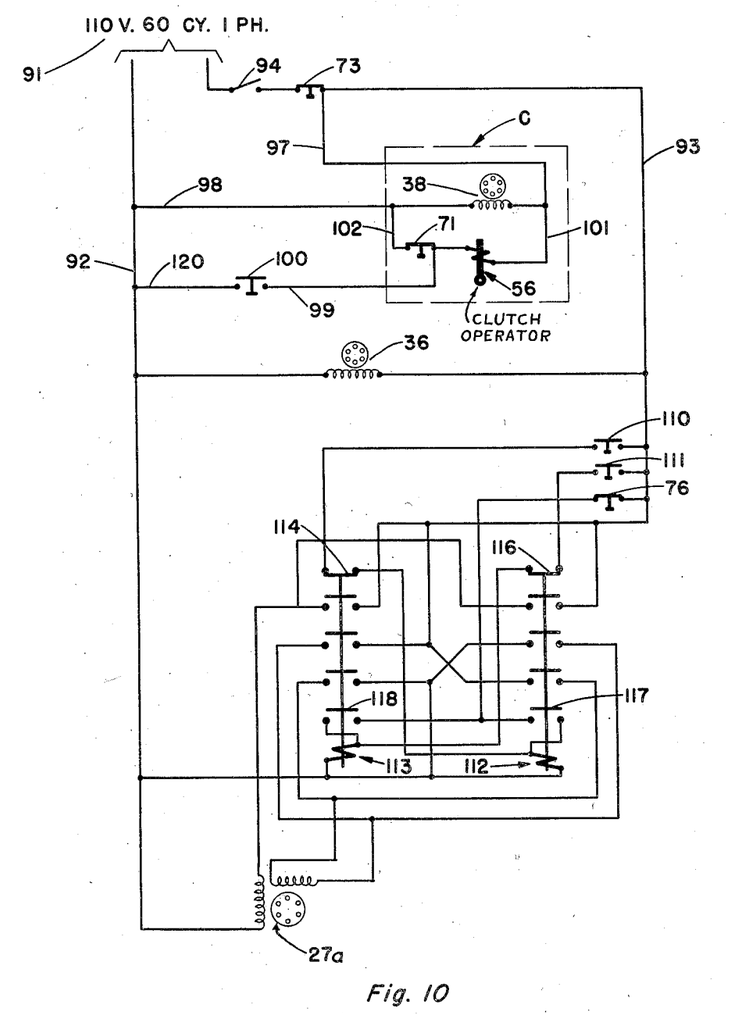
Figure 10 is a circuit diagram indicating a circuit by which the mechanism may be actuated.

Turning now to Figure 10 and the disclosure therein appearing of a circuit by which the above described mechanism may be operated and controlled, there is shown any convenient source 91 of electrical power of any convenient nature such as 60 cycle alternating. Connected to said source are the conductors 92 and 93, one of said conductors, as the conductor 93, being connected to the source through a conventional stop-start switch 94 and the safety switch 73. The three wire cable 95 shown in Figure 9 covers the conductors 97, 98 and 99 (Figure 10). The conductors 97 and 98 are connected to the conductors 93 and 92, respectively, at one end of each thereof and their other ends are connected to the terminals of the oscillating motor 38. Further conductors 101 and 102 connect the winding of the clutch solenoid 56 and the stop switch 71 in series with each other and in parallel with the oscillating motor 38. The conductor 120 connects the conductor 92 to one side of the start switch 100 and the conductor 99 connects the other side of said switch 100 to a point between the stop switch 71 and the winding of the clutch solenoid 56.

The winding of the timing motor 36 is connected directly across the conductors 92 and 93 so that this motor is running constantly whenever the apparatus is in operation.

A drum 105 (Figures 8 and 9) is supported upon shaft 40 for rotation therewith and is provided with suitable cams 106, 107 and 108, which may conveniently constitute removable pins or bars secured to the drum. These cams each operate against a switch finger of which one thereof appears at 109 in Figure 9, whereby upon engagement of the appropriate finger by one of said cams the forward switch 110, the reverse switch 111 or the start switch 100 (Figure 10) may be closed.

The normally open forward switch 110, the normally open reverse switch 111, and the normally closed limit switch 76 (Figure 10) are each connected from the conductor 93 through a forward relay 112 and a reverse relay 113 which relays in turn control the energization of the positioning motor 27. Closing of the forward switch 110, for example, will act through the normally closed contacts 114 of the reverse relay 113 to energize the winding of the forward relay 112. This effects a closing of all the contacts of said forward relay excepting the contact 116 and thus energizes the starting and running windings of the motor 27 in the usual manner. With the closing of all of the contacts of the forward relay excepting the contact 116 which is opened, potential is conducted through the normally closed limit switch 76 and through the contacts 117 and will hold the forward relay energized. When said limit switch 76 is open, however, and since the forward switch 110 has previously opened, the relay 112 will become de-energized, its contact 116 will close and its remaining contacts will open and the positioning motor 27 will stop. Closing of the reverse switch 111 will then act through the closed contacts 116 to energize the winding of the reverse relay 113 and thereby open its contacts 114 and close its remaining contacts. Energy conducted through the normally closed limit switch 76 will then act through the then closed contact 118 to hold said reverse relay in its energized position after the reverse switch has opened and for so long a time as the limit switch 76 remains closed. When said limit switch is again opened by a screw, as the screw 79 (Figure 9), coming in contact with the actuating arm of the limit switch 76 the reverse relay becomes de-energized and the positioning motor 27 again will stop.

A brake may be used to prevent over-travel of the rotatable parts.

OPERATION

Although the operation has been somewhat indicated in the preceding description and is probably apparent without further detailing, a review thereof will now be presented in the interest of completeness.

Figure 2:
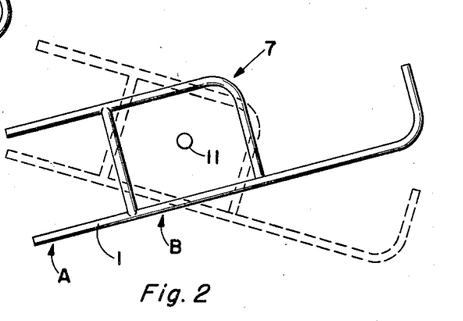
Figure 2 illustrates the approximate limits in the range of positions of the bank of tubes during the rocking or shaking operation.

With the mechanism in such a position that the screw 78 is adjacent the actuating arm of the limit switch 76 (Figure 9) which will place the bank of receptacles 7 in the position shown in Figure 1, the mechanism is started by closing the stop-start switch 94. This permits current to pass through the normally closed safety switch 73 and to effect the following: energize the oscillating motor 38 for continuous operation; energize the timing motor 36 and through the limit switch 76 energize one side of each of the relay contacts 117 and 118. The clutch solenoid 56 will not be energized inasmuch as, for reasons appearing more clearly hereinafter, the normal stopping position of the link 62 (Figure 11) will be such that the switch 71 will be held in open position. As the shaft 40 and the drum 105 thereon are turned in response to the energization of the timing motor 36, the cam 106 will close the start switch 100 and thereby energize the clutch solenoid 56 to connect the constantly running oscillating motor 38 to the crank 61 and thereby to effect oscillation of the shaft 18. This effects an oscillating movement of shaft 11 (Figure 1) and the bank of tubes as indicated in Figure 2. When the cam 106 ceases to hold the start switch closed, the normally closed stop switch 71 will hold said solenoid 56 energized until the disk 61 returns to the position shown in Figure 11 and the screw 70 thereby acts against the roller 72 and opens the stop switch 71. Thus, the oscillating functions of the mechanism will always start and stop in the same position.

Next the cam 107 will close the forward switch 110 (Figure 10) which will energize the relay 112 as above described and thereby commence operation of the positioning motor in the forward direction. In this case, inasmuch as the apparatus must turn sufficiently to place the bank of tubes in the position shown in Figure 3, it must also turn substantially further than would be permitted by the screw 78. Hence, the cam 107 will hold the forward switch closed until the screw 78 has passed the limit switch 76 whereupon the cam 107 terminates to permit the forward switch 110 to open so that the screw 81 on striking the limit switch 76 will stop the positioning motor 27 in the manner above described. After a liquid "B" has had time to drain from the shaking chamber 1 into the intermediate chamber 4, the cam 108 will effect a closing of the reverse switch 111 and thereby start the positioning motor operating in a reverse direction. This cam 108 will hold the reverse switch closed until the screw 77 has passed the limit switch 76 whereupon it terminates and the screw 79 will actuate the limit switch 76 and stop the receptacles in the position shown in Figure 4. The mechanism will pause momentarily in this position to give the several quantities of liquid time to flow into their next respective positions whereupon the start switch will again be closed by the cam 106 and the cycle will be repeated.

The screws 74 and 75 (Figure 9) are positioned for actuating the safety switch 73 if the panel 21, hence the bank of receptacles 7, rotates in either direction past the positions at which the screws 79 and 81 ought to contact the limit switch 76 and thereby stop the operation. It will be apparent from Figure 10 that opening of the safety switch 73 will de-energize the entire mechanism and cause the panel 21 to hold its position for reasons stated hereinabove.

It will be evident that due to the independent motors provided for operating the mechanism, positioning the receptacles and for the oscillation functions, that a wide variety of operations may be effected by a simple changing of the cams 106, 107 and 108. It will be further recognized that the oscillating function may be caused to occur in any position of the apparatus.

CIRCUIT OF FIGURE 13

Description of circuit

Figure 13:
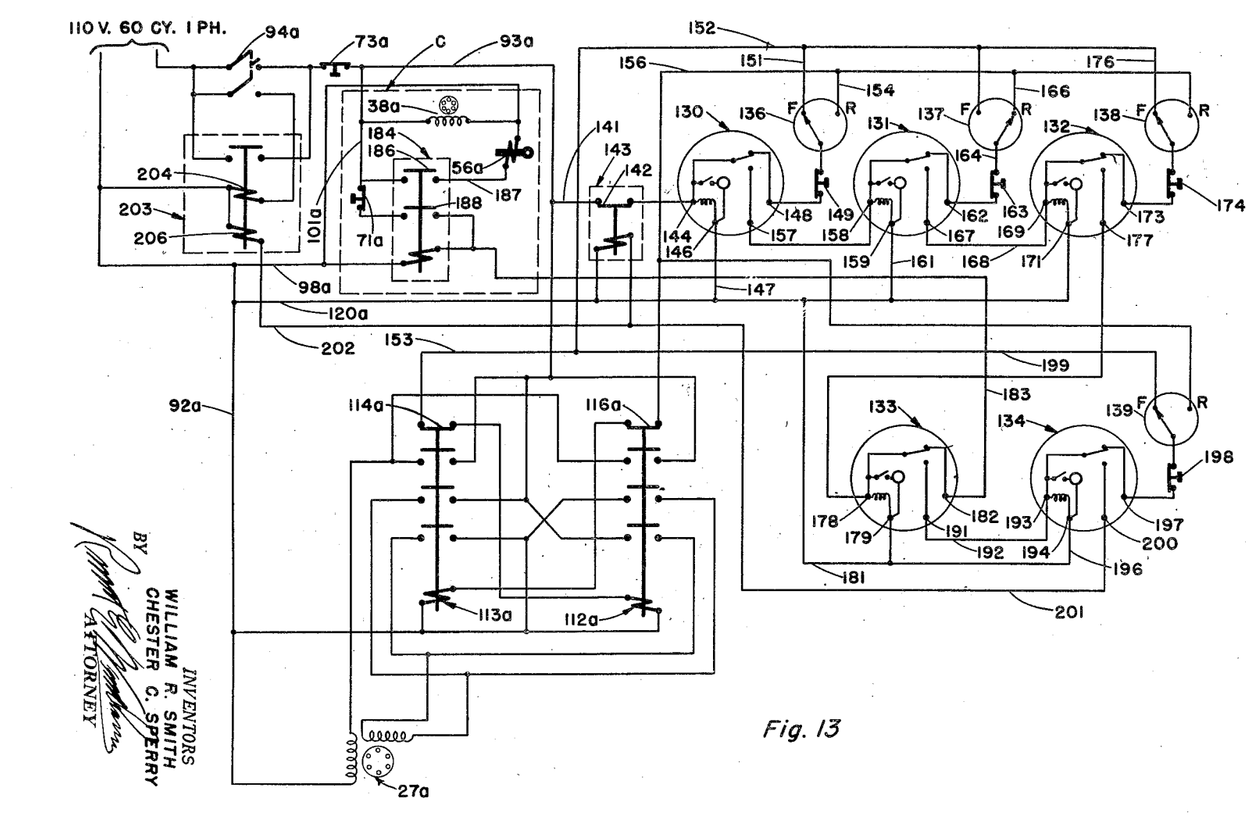
Figure 13 is a circuit diagram indicating an alternate control and operating circuit.

An alternate circuit and control mechanism for the above described apparatus are illustrated in Figures 13, 14 and 15. Certain similarities between the circuit of Figure 13 and that shown in Figure 10 will be apparent and the parts appearing in Figure 13 which correspond to those already detailed and described in Figure 10 are identified by corresponding numerals followed by the letter "a," and description of such parts does not need repeating.

In the circuit of Figure 13, the cam controlled switches 100, 110 and 111 of Figure 10 are replaced by a series of timing devices of such characteristics that energization thereof will initiate a timing function of a predetermined duration at the expiration of which a switch will be moved from a first position into a second position, and further, of such characteristics that upon de-energization this switch will immediately return to its first position. A large number of different types of such timers are available on the open market and hence further detailed description thereof is unnecessary. Mention need only be made that one satisfactory type is known to the trade as 5–TEC, type A, Cramer timer.

Turning now to Figure 13, five timers of the type mentioned are indicated at 130, 131, 132, 133 and 134, respectively. Manually controllable electric switches are indicated at 136, 137, 138 and 139, respectively.

Automatically operated switches, preferably microswitches, are indicated in Figures 13, 14 and 15 at 149, 163, 174 and 193. Said switches are conveniently mounted on the outer surface of panel 14a and are actuated respectively by screws 210, 211, 212 and 213 which are each inserted as desired into a selected one of a plurality of threaded openings in the inner face of the frame member 21a. The timers are each energized in cascade relation from the conductors 141 and 120a.

The conductor 141 connects the conductor 93a through the normally closed contacts 142 of a relay 143 to a binding post 144 of the timer 130. Said post 144 is connected through the energizing mechanism of the timer, as a small synchronous motor, to the post 146, which post is connected by the conductor 147 to the conductor 120a. Connection is normally made through the timer from the connecting post 144 to the connecting post 148 and thence through the normally closed contacts of the micro-switch 149 to the armature of the selector switch 136. If the armature of said selector switch 136 is in "F" position, as here shown, said switch is connected to the conductor 151 and thence through the conductor 152 and the conductor 153 to the contacts 114a of the reverse relay 113a to energize the winding of the forward relay 112a and run the motor 27a in a forward direction. This connection from the conductor 93a through the timer 130 to the contacts 114a corresponds to connection in the apparatus of Figure 10 from the conductor 93 to the contacts 114 through the switch 110. If the armature of the switch 136 (Figure 13) is moved to "R" position, connection will then be made through the conductors 154 and 156 to the contacts 116a of the relay 112a for operating the positioning motor 27a in a reverse direction.

After the timer 130 has timed out, its internal switch changes from the connecting post 148 to the connecting post 157 which effects a connection from the conductor 93a through the timer 130 to the binding post 158 of the timer 131. This timer is connected similarly to the timer 130 and potential applied to the connecting post 158 acts through the motor mechanism to the post 159 and thence through the conductor 161 to the conductor 120a. Upon the initial energization of the timer 131, the internal switch thereof conducts current to its connecting post 162 and thence through the normally closed contacts of the micro-switch 163 to the switch 137. Here, as indicated in the drawing, said switch will in one commonly used sequence of operation be set for connecting the conductor 164, through the conductor 166, through the conductor 156 and thence through the contact 116a of the forward relay 112a to energize the winding of the reverse relay 113a to run the positioning motor 27a in a reverse direction.

Figure 7:
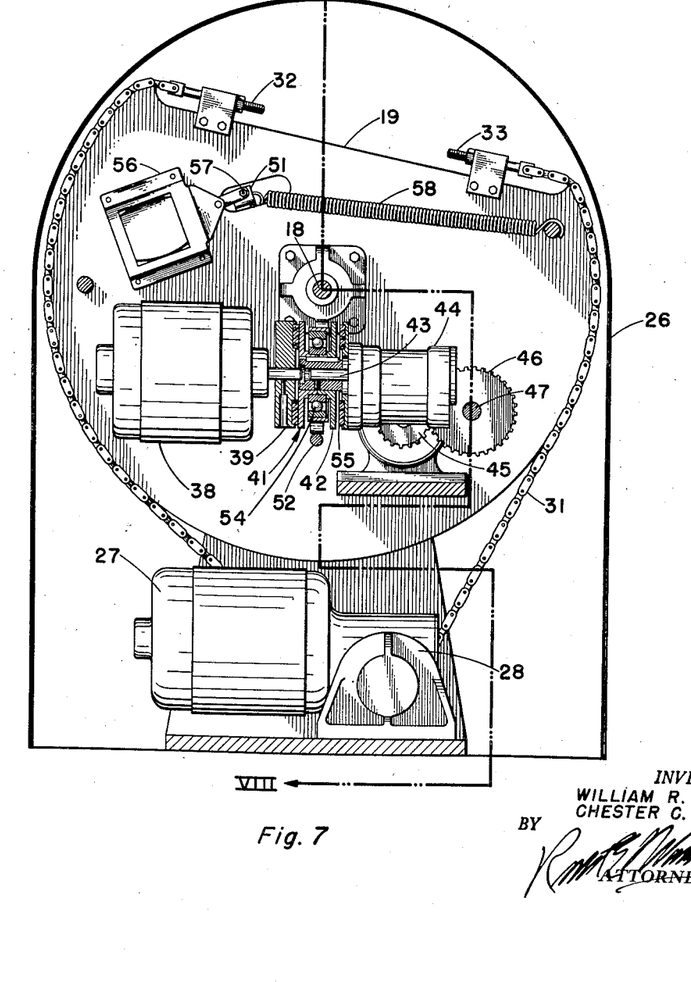
Figure 7 is a sectional view taken on the line VII—VII of Figure 6.
Figure 11:
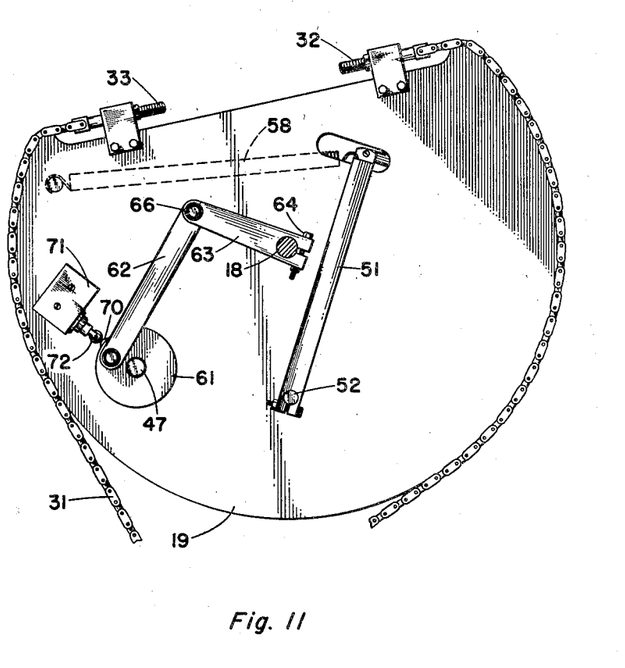
Figure 11 is a sectional view taken on the line XI—XI of Figure 8.

After said timer 131 has timed out, its internal switch shifts from the connecting post 162 to the connecting post 167 which is connected by the conductor 168 to the connecting post 169 of the timer 132. The connecting post 171 of said timer 132 is connected to the conductor 120a for completing energization of the timer motor. The connecting post 173, to which the internal switch is normally connected, connects through the normally closed contacts of the micro-switch 174 to the armature of the switch 138 which, in the position shown, is connected through the conductor 176 and the conductors 152 and 153 to the contact 114a of the relay 113a. When the timer has timed out, its internal switch shifts to connect post 169 to the post 177, which in turn is connected to the connecting post 178 of the timer 133. The post 179 of said timer is connected through the conductor 181 to the conductor 120a. In the initial position of the timer 133, its post 178 is connected through connecting post 182 to the conductor 183 and thence to the relay 184 which is part of the mechanism within the broken line C, which mechanism may be located on the panel 19. Said conductor 183 is connected through the winding of said relay 184 to the conductor 98a and is thereby connected to the other side of said source with respect to the conductor 93a. Said conductor 93a is also connected through the conductor 101a to the contacts 186 of said relay 184 and thence to the conductor 187 and through the winding of the solenoid 56a for actuating the clutch mechanism 41 (Figure 7). The other side of the winding of said solenoid 56a is connected through conductor 98a to the other side of the source. A second contact 188 in said relay 184 cooperates when closed with a normally closed stop switch 71a to hold the winding of relay 184 energized until said switch is opened by the screw 70 of the disk or crank 61 (Figure 11).

After the timer 133 has timed out, its internal switch changes the connection of post 178 from post 182 to post 191 thereby de-energizing the conductor 183 and the supply therefrom to the winding of relay 184. The stop switch 71a and the contacts 188 continue to hold the relay 184 energized from the conductor 101a until the screw 70 (Figure 11) opens the switch 71a and the oscillating function stops at a precisely predetermined point regardless of the exact moment with respect thereto of de-energizing the conductor 183. The energizing of post 191 acts through the conductor 192 to energize the timer 134 at its post 193. The other side of the motor connection of the timer 134 is connected from the post 194 through the conductor 196 and 181 to the conductor 120a. In the initial position of the timer 134, its post 193 is connected to the connecting post 197 and thence through the normally closed contacts of the micro-switch 198 to the armature of the switch 139, which in the position here shown is connected to the conductor 199 and thence through the conductor 153 to the contacts 114a of the relay 113a. This effects movement of the bank of tubes 7 in a desired direction to return it from its final oscillating position to the position shown in Figure 1. After the time 134 has timed out, its internal switch shifts and connects the post 193 to the post 200 and thence through the conductor 201 and through the winding of the relay 143 to the conductor 120a. Said post 200 is also connected through the conductors 201 and 202 to the winding 206 of the starting switch relay. Said relay is provided with convenient means, as permanent magnets, for holding its armature, after energization of the winding 204, in contact closing position even after deenergization of said winding 204. The winding 206 overcomes the effect of said permanent magnets for opening the contacts of the start relay 203.

*Operation of circuit*

In operation the apparatus disclosed in Figure 13 will parallel the operation of the apparatus previously described excepting that here the timers take the places of the cams and their cooperating micro-switches and thereby the apparatus in much more flexible and capable of ready adjustment through a larger number of operating sequences than the structure involving cams.

In the particular adjustment here shown (Figure 13), the apparatus is in its "at rest" condition and has no motors or coils energized at all. Manual closing of the starting switch 94a, and its subsequent locking by the winding 204, energizes the conductor 93a and the oscillating motor 38a. Simultaneously, current is conducted through the conductor 141 and the normally closed contacts 142 to energize the timer 130. The connection from the binding post 144 to the binding post 148 and thence through the switch 136 and the conductor 152 and 153 to the contacts 114a actuates the forward relay 112 and thereby starts the operation of the positioning motor 27a in the forward direction. This effects rotation of the panel 19 and parts associated therewith until the screw 210 (Figure 14) strikes the micro-switch 149 and opens its contacts. This de-energizes the motor 27a and terminates the forward motion of the panel 19. As soon thereafter as the timer 130 times out, its internal switch shifts to connect the binding post 144 to the binding post 157 and the timer 131 is energized. The initial setting of the timer 131 connects its binding post 158 to its binding post 162 and this acts through the switch 137 and the conductor 156 to energize the reverse relay 113a and thereby operate the motor 127a in a reverse direction. This operation continues until the screw 211 (Figure 14) strikes the micro-switch 163 and the switch 163 and the motor 27a are thereby de-energized. As soon thereafter as the timer 131 times out, it will connect its post 158 to the post 167 and thereby energize the timer 132. This will energize the motor 27a to run in a selected, here forward, direction until the screw 212 (Figure 14) strikes the micro-switch 174. As soon thereafter as the timer 132 times out it will connect its binding post 169 to the binding post 177 and thereby energize the timer 133 at its post 178. This directs current from the post 178 to the post 182 and thence to the conductor 183 to energize the relay 184 and thereby energize the clutch solenoid 56a. Inasmuch as the oscillating motor 38a is already rotating as above described, this will commence the oscillating function of the apparatus. As soon as the timer 133 has timed out, its internal switch shifts, the post 182 is de-energized and the post 191 is energized. This terminates the oscillating function by de-energizing the relay 184 and the timer 134 now becomes energized. At the beginning of energization of the timer 134, connection is provided from the binding post 193 to the binding post 197 and thence through the switch 139 to again energize the forward relay 112a and operate the positioning motor 27a to bring the apparatus from its oscillation position toward its rest position as appearing in Figure 1. This will continue until the screw 213 (Figure 14) opens the micro-switch 198 and thereby stops the positioning motor. This permits a periods of rest to enable the liquids which were shaken together by the oscillating function to separate into upper and lower levels. As soon thereafter as the timer 134 times out, connection will be from the post 193 to the post 200 and this will act through the conductors 201 and 201a to energize the winding of the relay 143. This opens the contacts 142 of said relay and thereby de-energizes the entire system of timers and returns all of them to normal. Simultaneously, the energizing of the conductor 201 will energize the conductor 202 and this will energize the release coil 206. This coil is placed in opposition to coil 204 and hence when energized it will open the locking relay 203. Thus, if the start switch 94a has been opened, the opening of the contacts of the relay 203 de-energizes the rest of the apparatus until it is again started by manually closing said start switch 94a. This arrangement assures the stopping of the apparatus and the de-energizing of the timers only at the end of a cycle regardless of when the stop-start switch 94a is opened. This relay has, of course, no effect on the safety switch and it, when opened, will de-energize the entire apparatus, excepting only said relay.

It will be appreciated that the flexibility introduced by the switches 136, 137, 138 and 139, by the timers, and by the independent operation of the micro-switches 149, 163, 174 and 198 with respect to the timers, provides an extremely flexible operation and one in which a very large number of patterns may be brought about quickly and easily.

It will thus be recognized that we have provided an extremely flexible and readily adjustable device which fully meets the objects and purposes above set forth.

While the foregoing preferred embodiment has shown a constantly running motor in conjunction with a clutch arranged on the rotatably mounted structure including the panels 19 and 21, it will be appreciated that the clutch may in some circumstances be eliminated and the starting and stopping of the oscillating function effected directly by energization and de-energization of said motor. Similarly, while a positioning motor 27 has been shown as effecting its functions by the starting and stopping thereof and by effecting its running in a forward direction or a reverse direction, it will be within the scope of the invention in some instances to utilize other forms of motive power controllable for operation in one direction or in an opposite direction and for starting and stopping, such as a pressure fluid motor geared, or otherwise connected, for effecting forward and reverse rotation of the shaft 18.

While we have selected a specific preferred embodiment of our invention for illustrative purposes, it should be clearly understood that a large number of variations from the specific form here shown will occur at once to persons acquainted with apparatus of this general type and hence the hereinafter appended claims are to be construed as including such variations excepting as said claims by their own terms specifically require otherwise.

We claim:

1. In apparatus for rotating and oscillating a shaft in a predetermined pattern, the combination comprising: a frame and a shaft rotatably supported in said frame; a panel, said shaft being relatively rotatable with respect to said panel; means including a first prime mover mounted on said panel for effecting oscillation of said shaft with respect to said panel upon energization of said prime mover; means including a second prime mover mounted on said frame for effecting rotation of said panel around the axis of said shaft upon energization of said second prime mover; control apparatus starting and stopping the functioning of each of said last two named means in predetermined sequence.

2. In apparatus for rotating and oscillating a shaft through a predetermined pattern, the combination comprising: a frame and a shaft rotatably supported in said frame; a panel, said shaft being relatively rotatable with respect to said panel; a first prime mover mounted on said panel; means effecting oscillation of said shaft with respect to said panel upon energization of said first prime mover including clutch means interposed between said first prime mover and said last named means; a second prime mover mounted on said frame; means effecting rotation of said panel upon energization of said second prime mover; control apparatus (1) engaging and disengaging said clutch and (2) energizing and de-energizing said second prime mover in predetermined sequence.

3. In apparatus for rotating and oscillating a shaft through a predetermined pattern, the combination comprising: a frame and a shaft rotatably supported in said frame; a panel, said shaft being relatively rotatable with respect to said panel; a first prime mover mounted on said panel; a crank affixed to said shaft; a second crank rotatably mounted on said panel; linkage connecting said cranks; means including a clutch driving said second crank from said first prime mover; a second prime mover mounted on said frame; means rotating said panel in response to energization of said second prime mover; and control apparatus energizing and de-energizing said second prime mover and connecting and disconnecting said clutch in predetermined sequence with respect to each other.

4. In apparatus for rotating and oscillating a shaft through a predetermined pattern, the combination comprising: a frame and a shaft rotatably supported in said frame; a panel, said shaft being rotatable with respect to said panel; a first prime mover mounted on said panel; a crank affixed to said shaft; a second crank rotatably mounted on said panel; linkage connecting said cranks; means including a solenoid controlled clutch driving said second crank from said first prime mover; a second prime mover mounted on said frame; means rotating said panel in response to energization of said second prime mover; and control apparatus energizing and de-energizing said solenoid and said second prime mover all in predetermined sequence with respect to each other.

5. In apparatus for rotating and oscillating a shaft through a predetermined pattern, the combination comprising: a frame and a shaft rotatably supported in said frame; a panel, said shaft being rotatable with respect to said panel; a first motor for oscillating said shaft mounted on said panel; a crank affixed to said shaft; a second crank rotatably mounted on said panel; linkage connecting said cranks; means including a solenoid controlled clutch driving said second crank from said first motor; a positioning motor mounted on said frame; means rotating said panel in response to energization of said positioning motor; a constantly running timing motor; means energizing said timing motor and said first motor at least during their respective periods of operation and means including cam means driven by said timing motor for energizing and de-energizing said positioning motor and said solenoid in predetermined sequence with respect to each other.

6. Apparatus as described in claim 5 including a second panel spaced from said panel and rotatably mounted upon said shaft, and said control apparatus including engaging means on said second panel and a limit switch positioned adjacent thereto for engagement by said engaging means in selected rotated positions of said panel.

7. Apparatus as described in claim 4 wherein said control apparatus includes a plurality of independently driven timers connected in cascade relationship with each other and including means connecting each of said timers to said solenoid and to said second prime mover so that successive energization and de-energization of selected contacts of said timers effects successive energization and de-energization of said solenoid and said second prime mover, all in predetermined sequence with respect to each other.

8. Apparatus as described in claim 4 wherein said control apparatus includes a plurality of independently driven timers connected in cascade relationship with each other and including means connecting each of said timers to said solenoid and said second prime mover so that successive energization and de-energization of selected contacts of said timers effects successive energization and de-energization of said solenoid and said second prime mover, all in predetermined sequence with respect to each other; and further connections so that the timing out of the last-named timer of said cascade series effects de-energization of the entire group of timers and a return to their respective initial positions.

9. In apparatus for rotating and oscillating a shaft through a predetermined pattern, the combination comprising: a frame and a shaft rotatably supported by said frame; a panel, said shaft being relatively rotatable with respect to said panel; a first prime mover mounted on said panel; a clutch on said panel having its driving side connected to said first prime mover, and means including linkage driven by the driven side of said clutch for effecting relative oscillatory motion between said shaft and said panel upon rotational movement of the driven side of said clutch; means holding said clutch normally disengaged and electrically energizable means for engaging said clutch; a second prime mover mounted on said frame; means rotating said panel and said shaft in response to energization of said second prime mover; and control apparatus energizing and de-energizing said electrically energizable means and second prime mover in predetermined sequence with respect to each other.

10. In apparatus for rotating and oscillating a shaft through a predetermined pattern, the combination comprising: a frame and a shaft rotatably supported by said frame; a panel, said shaft being relatively rotatable with respect to said panel; a first prime mover mounted on said panel; a clutch on said panel having its driving side connected to said first prime mover, and means including linkage driven by the driven side of said clutch for effecting relative oscillatory motion between said shaft and said panel upon rotational movement of the driven side of said clutch; a solenoid on said panel and means responsive to energization of said solenoid for engaging said clutch, means holding said clutch normally disengaged; a second prime mover mounted on said frame; means rotating said panel and said shaft in response to energization of said second prime mover; and control apparatus energizing and de-energizing said electrically energizable means and second prime mover in predetermined sequence with respect to each other.

11. In apparatus for rotating and oscillating a shaft through a predetermined pattern, the combination comprising: a frame and a shaft rotatably supported by said frame; a panel rotatably mounted with respect to said frame, said shaft being capable of rotation relative to said panel; a first prime mover mounted in fixed relation to said panel; a clutch on said panel having its driving side connected to said first prime mover, and means including linkage driven by the driven side of said clutch for effecting relative oscillatory motion of said shaft with respect to said panel upon rotational movement of the driven side of said clutch; means holding said clutch normally disengaged; electro-responsive means for overcoming said last-named means and effecting engagement of said clutch; a second prime mover mounted in fixed relation to said frame; means rotating said panel and said shaft in response to energization of said second prime mover; and control apparatus energizing and de-energizing said electro-responsive means and said second prime mover in predetermined sequence with respect to each other.

12. In apparatus for rotating and oscillating a shaft in a predetermined pattern, the combination comprising: a frame and a shaft rotatably supported by said frame; a panel, said shaft being rotatable with respect to said panel; means including a first source of rotary motion mounted on said panel for effecting oscillation of said shaft with respect to said panel upon energization of said first source; means including a second source of rotary motion mounted on said frame for effecting rotation of said panel around the axis of said shaft with respect to said frame upon energization of said second source; control apparatus energizing and de-energizing each of said two sources in predetermined sequence.

13. In apparatus for rotating and oscillating a shaft in a predetermined pattern, the combination comprising: a frame and a shaft rotatably supported by said frame; a panel on said shaft, said shaft being rotatable with respect to said panel; means including a first source of motion mounted on said panel and linkage connected to said source for effecting oscillation of said shaft with respect to said panel upon energization of said first source; means including a second source of rotary motion mounted on said frame for effecting rotation of said panel around the axis of said shaft with respect to said frame upon energization of said second source; control apparatus automatically energizing and de-energizing each of said two sources in predetermined sequence.

14. In a device for imposing a preselectable sequence of rotational movements upon a shaft, the combination comprising: a frame; a shaft rotatably supported upon said frame; a first crank secured to said shaft; a panel supported upon said shaft, said shaft being rotatable with respect to said panel; a first prime mover mounted upon said panel for rotation therewith; a second crank rotatably supported upon said panel at a point spaced from the rotational axis thereof, said second crank being rotatably actuatable by said first prime mover; clutch means mounted upon said panel for controllably connecting said first prime mover to said second crank; damping means associated with said second crank for preventing rotation thereof except by said first prime mover; a second prime mover mounted upon said frame; drive means connecting said second prime mover to said panel for rotating same; linkage connecting said cranks, said linkage and cranks effecting oscillation of said shaft with respect to said panel when actuated by said first prime mover; electrically energizable means and means responsive to such energization for effecting connection by said clutch means between said second crank and said first prime mover; means urging said responsive means normally to effect disconnection by said clutch; and mechanism controlling the energization and de-energization of said electrically energizable means and said prime movers in a predetermined pattern with respect to each other.

15. In apparatus for rotating and oscillating a shaft through a predetermined pattern, the combination comprising: a frame and a shaft rotatably supported in said frame; a panel mounted concentric with said shaft, said shaft being rotatable with respect to said panel; means including a first motor for effecting oscillation of said shaft with respect to said panel when said first motor is energized; a positioning motor mounted on said frame; means rotating said panel in response to energization of said positioning motor; a constantly running timing motor; means energizing said timing motor and said motor and means including cam means driven by said timing motor for energizing and de-energizing said positioning motor and for energizing and deenergizing said shaft oscillating motor in predetermined sequence with respect to each other.

16. Apparatus as described in claim 15 wherein said apparatus includes a plurality of independently driven timers connected in cascade relationship with each other and including means connecting each of said timers to said shaft oscillating motor and to said positioning motor so that successive energization and deenergization of selected contacts of said timers effects successive energization and deenergization of said shaft oscillating motor and said positioning motor all in predetermined sequence with respect to each other.

17. An apparatus for rotating and oscillating a shaft through a predetermined pattern including in combination: a frame; a shaft rotatably supported upon said frame; a first crank secured to said shaft; a panel supported for relative rotation upon said shaft; a first prime mover mounted upon said panel for rotation therewith; a second crank rotatably supported upon said panel at a point spaced from the rotational axis thereof, said second crank being rotatably actuatable by said first prime mover; clutch means mounted upon said panel for controllably connecting said first prime mover to said second crank; damping means associated with said second crank for preventing rotation thereof except by said first prime mover; a second prime mover mounted upon said frame; drive means connecting said second prime mover to said panel for rotating same; linkage connecting said cranks, said linkage and cranks effecting oscillation of said shaft with respect to said panel when actuated by said first prime mover; electrically energizable means and means responsive to such energization for effecting connection by said clutch means between said second crank and said first prime mover; means urging said responsive means normally to effect disconnection by said clutch; a constantly running timing motor; means energizing said timing motor and said first prime mover at least during their respective periods of operation and means including cam means driven by said timing motor for energizing and deenergizing said second prime mover and said electrically energizable means in predetermined sequence with respect to each other.

18. In apparatus for rotating and oscillating a shaft in a predetermined pattern, the combination comprising: a frame and a shaft rotatably supported by said frame; a panel supported for relative rotation on said shaft; means including a first source of motion mounted on said panel and means connected to said source for effecting oscillation of said shaft with respect to said panel upon energization of said first source; means including a second source of rotary motion mounted on said frame for effecting rotation of said panel around the axis of said shaft with respect to said frame upon energization of said second source; control apparatus automatically energizing and deenergizing each of said two sources in predetermined sequence.

19. In apparatus for rotating and oscillating a shaft in a predetermined pattern, the combination comprising: a frame and a shaft rotatably supported by said frame; a panel supported for relative rotation on said shaft; means including a first source of motion mounted on said panel and means connected to said source for effecting oscillation of said shaft with respect to said panel upon energization of said first source; means including a second source of rotary motion mounted on said frame for effecting rotation of said panel around the axis of said shaft with respect to said frame upon energization of said second source; control apparatus automatically connecting and disconnecting said shaft oscillation effecting means and energizing and deenergizing said second source in predetermined sequence with respect to each other.

20. In an apparatus for rotating and oscillating a shaft in a predetermined pattern, the combination comprising: a frame, a shaft rotatably supported by said frame; a first prime mover, a first connecting means for connecting said first prime mover to said shaft for effecting oscillation of said shaft; a second prime mover, a second connecting means connecting said second prime mover to said shaft for effecting rotation of said shaft; said second connecting means including means permitting said shaft to freely oscillate relative to said second connecting means when said first prime mover is energized, said second connecting means including means for causing said shaft to rotate therewith when said second prime mover is energized; control apparatus for energizing and deenergizing said first and second prime movers in selected sequence.

21. In an apparatus for rotating and oscillating a shaft through a predetermined pattern, the combination comprising: a frame, a shaft rotatably supported in said frame, a panel relatively rotatable with respect to said shaft; a first prime mover mounted so that it always occupies the same position relative to said panel in all positions of said panel, means connecting said first prime mover to said shaft for effecting oscillation of said shaft with respect to said panel upon energization of said first prime mover; means including a second prime mover mounted on said frame for effecting rotation of said panel and said shaft around the axis of said shaft upon energization of said second prime mover; means for energizing and deenergizing said first and second prime movers in selected sequence.

References Cited in the file of this patent
UNITED STATES PATENTS
2,247,842   Kamenarovic ___________ July 1, 1941